July 28, 1953     W. C. FERGUSON     2,646,822
PLASTIC-COATED PIPE AND PIPE FITTING
Filed Dec. 31, 1949

William C. Ferguson,
Inventor,
Haynes and Koenig,
Attorneys.

Patented July 28, 1953

2,646,822

UNITED STATES PATENT OFFICE 2,646,822

PLASTIC-COATED PIPE AND PIPE FITTING

William C. Ferguson, St. Louis, Mo., assignor to The Presstite Engineering Company, St. Louis, Mo., a corporation of Missouri Application December 31, 1949, Serial No. 136,285

6 Claims. (Cl. 138—68)

This invention relates to plastic-coated pipe and pipe fittings and more particularly to joints for pipe and pipe fittings which have an external corrosion-resistant plastic coating.

The object of the invention is the provision of a threaded pipe joint for pipe and pipe fittings having an external corrosion-resistant plastic coating which makes use of the plastic to form a joint seal, so that no sealing material other than the plastic and no operation other than that of threading a pipe and a fitting together are required to form a tight joint, whereby a plurality of pipes may be readily coupled to form a continuous string entirely coated with plastic.

In general, the principal features of the invention whereby these results are attained involve the provision of a pipe having an external pipe thread at one end and an external corrosion-resistant plastic coating reaching substantially to but not covering the thread, and a pipe fitting, which may be a straight coupling, for example, having an internal pipe thread adjacent one end of its bore with this end of the bore conically countersunk, the fitting also having an external corrosion-resistant plastic coating completely covering its exposed surface. The pipe and the fitting are threaded together with the countersunk end of the fitting surrounding the pipe inward of the thread on the end of the pipe and squeezing the plastic coating thereon to seal the joint. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
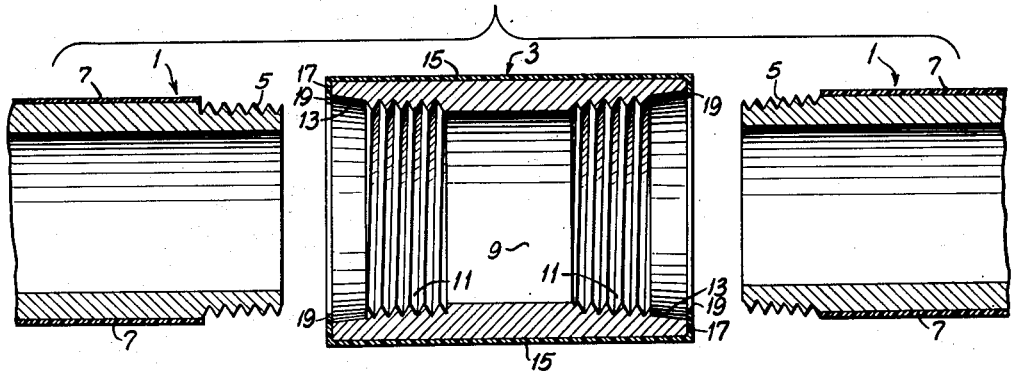
Figure 2:
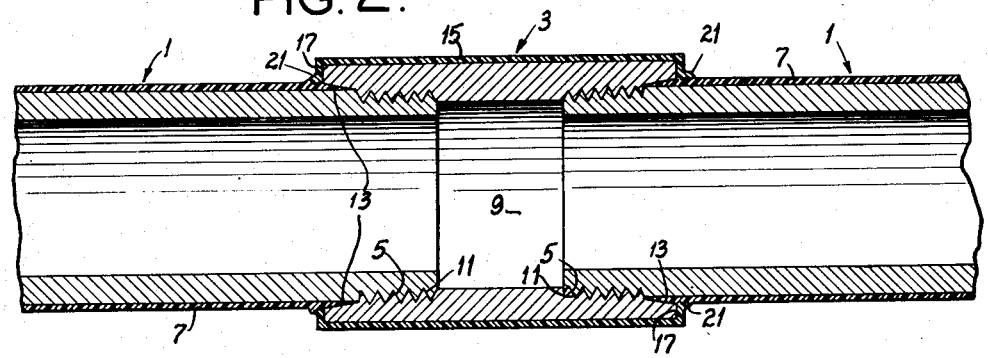
Figure 3:
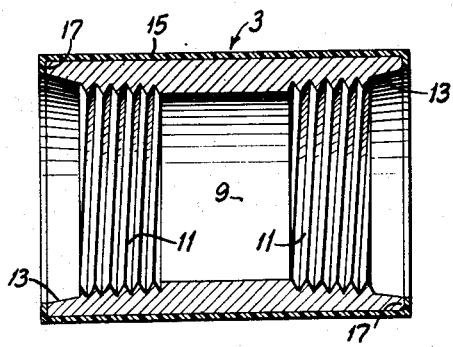

In the accompanying drawing, in which several of various possible embodiments of the invention are illustrated, Fig. 1 is an exploded view showing in longitudinal section two pipes and a straight pipe coupling of this invention in position for being threaded together;

Fig. 2 is a longitudinal section of the resulting string of pipes and coupling of Fig. 1 threaded together; and Fig. 3 is a longitudinal section of a modified pipe coupling of this invention.

Similar reference characters indicate corresponding parts throughout the several views of the drawing.

Referring to the drawing, Fig. 1 shows two pipes 1 and a straight coupling 3 for joining the pipes together. Each pipe has an external pipe thread 5 at its end whereby it may be threaded into one end of the coupling, and has an external corrosion-resistant plastic coating 7 which reaches substantially to but does not cover the thread, the latter being clean. The straight coupling 3 is exemplary of various pipe fittings in which the invention may be embodied. For example, the invention is also applicable to elbows, T's, crosses, reducers, or any other of the conventional pipe fitting forms. The coupling shown herein by way of example, comprises a straight length of tubing of greater diameter than the pipe 1. The passage or bore of the coupling is designated 9. This is internally threaded with pipe threads 11 adjacent the ends of the bore to receive the threaded ends of the pipes. Each end of the bore is conically countersunk, or counter-bored as indicated at 13. The coupling has a corrosion-resistant plastic coating 15 completely covering its exposed surface, including its annular end faces 17. The coating has integral portions projecting inward past the annular end faces to form inwardly projecting narrow annular plastic flanges 19, with the opening through the flanges of slightly greater diameter than the diameter of the threads on the ends of the pipes. The ends of the coupling are countersunk to such a depth and with such a bevel that the outer and larger ends of the countersinks are of slightly greater diameter than the outside diameter of the coating on the pipes, and the depth of the countersinks are considerably greater than the thickness of the coating on the pipes. As illustrated, the bevel angle of the countersinks is about 9°.

The plastic coating on the pipes and on the coupling is preferably a polyethylene coating. It could be any other corrosion-resistant plastic suitable for extrusion-coating the pipes, such as polystyrene. In an exemplary embodiment of the invention for polyethylene-coated pipe of 1¼ inch inside diameter, the plastic coating is approximately 0.030 inch thick. The threads on the pipes and in the coupling are each about ⅝ inch long. The countersinks 13 are some ¼ inch deep and flare a little more than the thickness of the coating (0.030 inch) in the ¼ inch depth of the countersinks.

When the pipes and the couplings are threaded together, as illustrated in Fig. 2, the countersunk ends of the coupling surround the plastic-coated portions of the pipes inward of the threads on the ends of the pipes and squeeze the plastic in the conical spaces between the countersunk ends of the couplings and the pipes to form tight corrosion-resistant seals. The plastic in the flange 19 is also squeezed in this space. Excess plastic is squeezed out of the space and forms a fillet 21.

Fig. 3 illustrates a modification of the coupling which is in all respects like the coupling shown in Fig. 1 except that the plastic flange 19 is omitted. With this modification all of the plastic for sealing is obtained from the coating on the pipes rather than partly from the coating on the pipes and partly from the plastic flange 19 as with the Fig. 1 form.

It will be seen that with the invention, a plurality of pre-coated pipes may be coupled together with pre-coated fittings to form a continuous string of pipes and fittings with the string completely sealed by the essentially continuous plastic coating.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. In combination, a pipe having an external pipe thread at one end and an external corrosion-resistant plastic coating reaching substantially to but not covering said thread, and a pipe fitting having an internal pipe thread adjacent one end of its bore with said end of the bore conically countersunk, the fitting having an external corrosion-resistant plastic coating completely covering its exposed surface, the pipe and fitting being threaded together with the countersunk end of the fitting extending beyond the inner end of the external thread on the pipe and surrounding the end portion of the plastic coating on the pipe and squeezing the plastic coating thereon to seal the joint and to form an essentially continuous coating.

2. In combination, a pipe having an external pipe thread at one end and an external corrosion-resistant plastic coating reaching substantially to but not covering the thread, and a pipe fitting having an internal pipe thread adjacent one end of its bore with said end of the bore conically countersunk, the outer and larger end of the bore being of slightly greater diameter than the outside diameter of the coating on the pipe and the bore being countersunk to a depth considerably greater than the thickness of the coating, the fitting having an external corrosion-resistant plastic coating completely covering its exposed surface, the pipe and fitting being threaded together with the countersunk end of the fitting extending beyond the inner end of the external thread on the pipe and surrounding the end portion of the plastic coating on the pipe and squeezing the plastic between the ends of the fitting and the pipe to seal the joint.

3. In combination, a pipe having an external pipe thread at one end and an external corrosion-resistant plastic coating reaching substantially to but not covering the thread, and a pipe fitting having an internal pipe thread adjacent one end of its bore with said end of the bore conically countersunk, the outer and larger end of the bore being of slightly greater diameter than the outside diameter of the coating on the pipe and the bore being countersunk to a depth considerably greater than the thickness of the coating, the fitting having an external corrosion-resistant plastic coating completely covering its exposed surface, the pipe and fitting being threaded together with the countersunk end of the fitting extending beyond the inner end of the external thread on the pipe and surrounding the end portion of the plastic coating on the pipe and squeezing the plastic between the ends of the fitting and the pipe to seal the joint, the fitting initially having an annular flange of the plastic as an integral part of the coating on the fitting projecting inward from its end, with the opening through the flange of greater diameter than the diameter of the threads, the plastic of the flange being squeezed between the end of the fitting and the pipe, the excess plastic being squeezed out and forming a fillet.

4. In combination, a pipe having an external pipe thread at one end and an external corrosion-resistant polyethylene coating reaching substantially to but not covering said thread, and a pipe fitting having an internal pipe thread adjacent one end of its bore with said end of the bore conically countersunk, the fitting having an external corrosion-resistant polyethylene coating completely covering its exposed surface, the pipe and fitting being threaded together with the countersunk end of the fitting extending beyond the inner end of the external thread on the pipe and surrounding the end portion of the polyethylene coating on the pipe and squeezing the polyethylene coating thereon to seal the joint.

5. In combination, a pipe having an external pipe thread at one end and an external corrosion-resistant polyethylene coating reaching substantially to but not covering the thread, and a pipe fitting having an internal pipe thread adjacent one end of its bore with said end of the bore conically countersunk, the outer and larger end of the bore being of slightly greater diameter than the outside diameter of the coating on the pipe and the bore being countersunk to a depth considerably greater than the thickness of the coating, the fitting having an external corrosion-resistant polyethylene coating completely covering its exposed surface, the pipe and fitting being threaded together with the countersunk end of the fitting extending beyond the inner end of the external thread on the pipe and surrounding the end portion of the polyethylene coating on the pipe and squeezing the polyethylene between the ends of the fitting and the pipe to seal the joint.

6. In combination, a pipe having an external pipe thread at one end and an external corrosion-resistant polyethylene coating reaching substantially to but not covering the thread, and a pipe fitting having an internal pipe thread adjacent one end of its bore with said end of the bore conically countersunk, the outer and larger end of the bore being of slightly greater diameter than the outside diameter of the coating on the pipe and the bore being countersunk to a depth considerably greater than the thickness of the coating, the fitting having an external corrosion-resistant polyethylene coating completely covering its exposed surface, the pipe and fitting being threaded together with the countersunk end of the fitting extending beyond the inner end of the external thread on the pipe and surrounding the end portion of the polyethylene coating on the pipe and squeezing the polyethylene between the ends of the fitting and the pipe to seal the joint, the fitting initially having an annular flange of the polyethylene as an integral part of the coating on the fitting projecting inward from its end, with the opening through the flange of greater diameter than the diameter of the threads, the polyethylene of the flange being squeezed between the end of the fitting and the pipe, the excess polyethylene being squeezed out and forming a fillet.

WILLIAM C. FERGUSON.

References Cited in the file of this patent

UNITED STATES PATENTS

| Number | Name | Date |
| --- | --- | --- |
| 645,187 | Richmondt | Mar. 13, 1900 |
| 1,120,731 | McIlroy | Dec. 15, 1914 |
| 1,497,386 | Wry | June 10, 1924 |
| 1,842,298 | Smith | Jan. 19, 1932 |
| 1,969,588 | Sweet | Aug. 7, 1934 |
| 2,233,734 | Ely et al. | Mar. 4, 1941 |
| 2,440,651 | Bell | Apr. 27, 1948 |